April 13, 1926.
H. P. MACDONALD
FLEXIBLE JOINT
Filed August 6, 1919
1,580,747
2 Sheets-Sheet 1
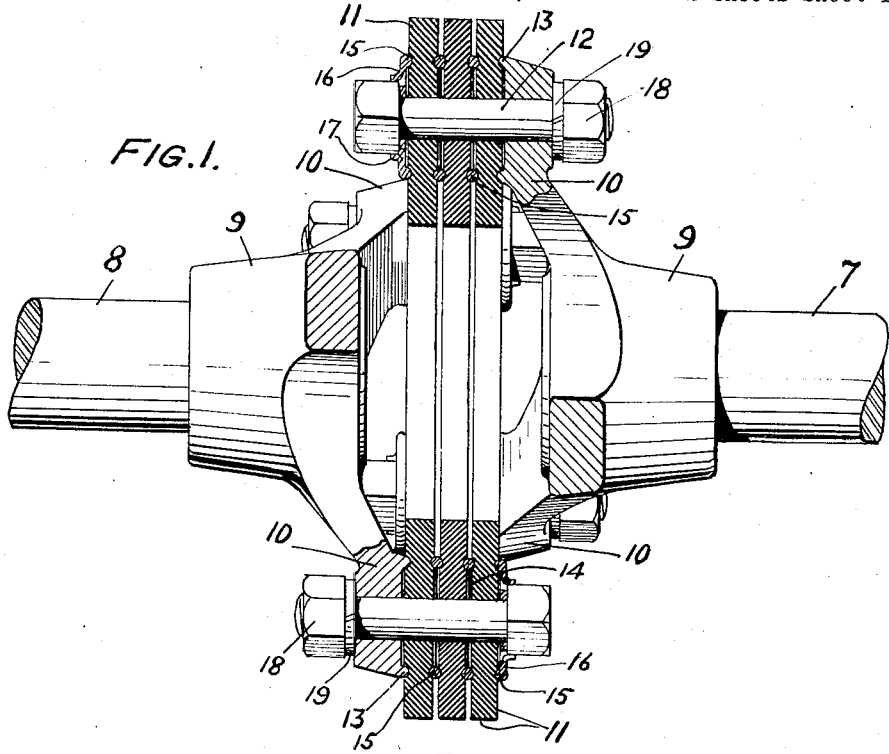
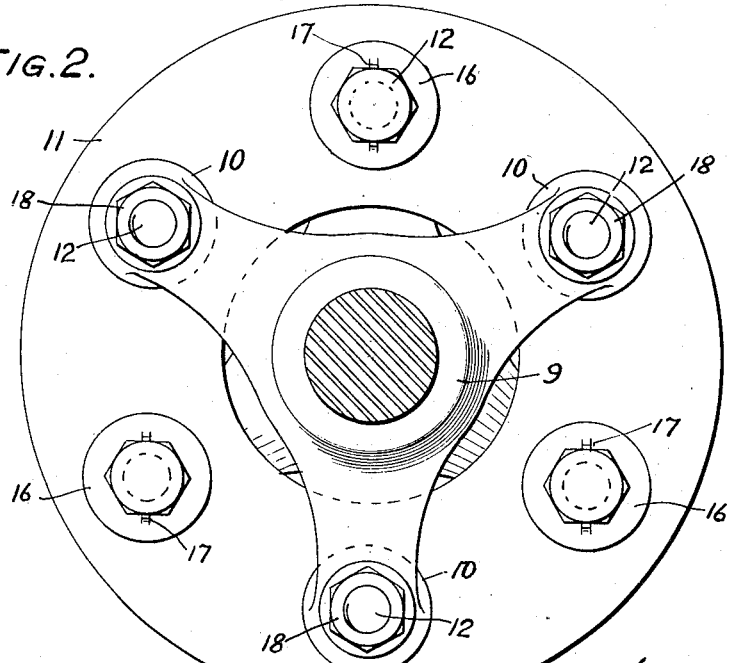
WITNESS:
INVENTOR
Harry P. Macdonald
BY
ATTORNEYS.

April 13, 1926.
H. P. MACDONALD
FLEXIBLE JOINT
Filed August 6, 1919
1,580,747
2 Sheets-Sheet 2
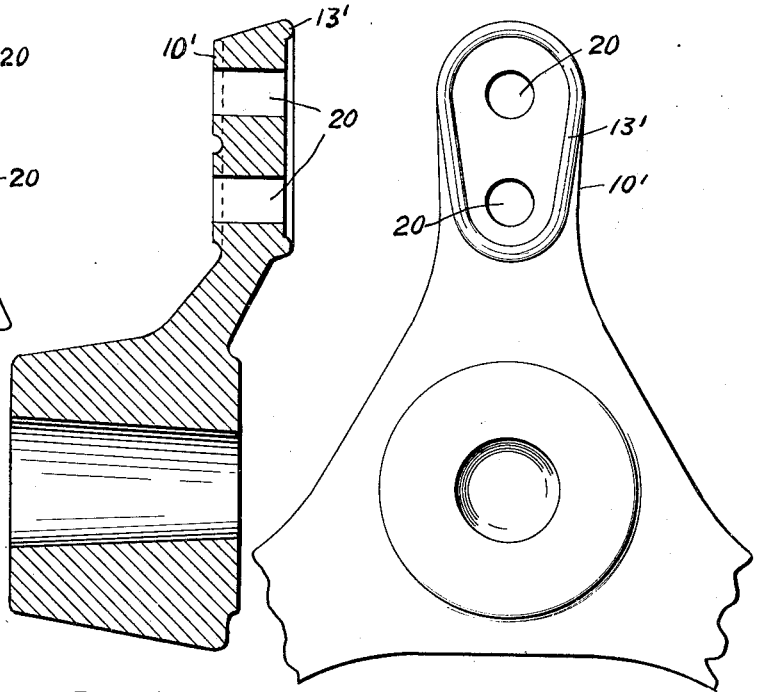
FIG.3.
FIG.4.
FIG.5.
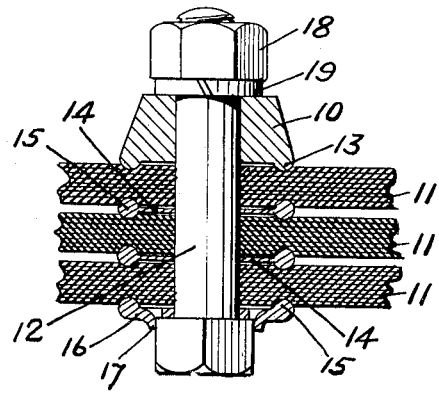
FIG.6.
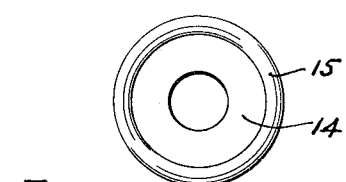
FIG.7.
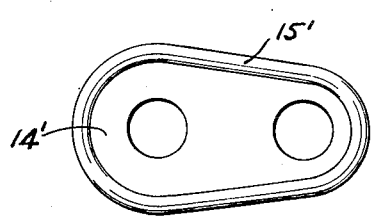
FIG.8.
WITNESS:
Rob. R. Kitchel.
INVENTOR
Harry P. Macdonald
BY
Symmesturdt & Leebuer
ATTORNEYS.

Patented Apr. 13, 1926.

1,580,747

UNITED STATES PATENT OFFICE.

HARRY P. MACDONALD, OF MONTCLAIR, NEW JERSEY, ASSIGNOR, BY MESNE ASSIGNMENTS, TO SPICER MANUFACTURING CORPORATION, OF SOUTH PLAINFIELD, NEW JERSEY, A CORPORATION OF VIRGINIA.

FLEXIBLE JOINT.

Application filed August 6, 1919. Serial No. 315,613.

*To all whom it may concern:*

Be it known that I, HARRY P. MACDONALD, a citizen of the United States, residing at Montclair, in the county of Essex and State of New Jersey, have invented certain new and useful Improvements in Flexible Joints, of which the following is a specification.

This invention relates to flexible joints, such, for example, as are used in the transmission of power, the joint being particularly useful in automobile drives.

The invention relates in general to that type of flexible joint in which the torque of the drive shaft is transmitted to the driven shaft through the medium of one or more flexible discs, connected alternately to the feet of the spiders on the respective shafts, by means of bolts.

It has been attempted to distribute the strain on the discs over as wide an area as possible for the purpose of relieving those portions of the discs immediately adjacent the bolt hole openings from a portion of the stresses, by providing the feet of the spiders and also the washers spacing the discs with roughened surfaces, such, for example, as radial fluting or a plurality of concentric corrugations, or a plurality of ribs extending transversely of the line of thrust. Such constructions, however, have largely failed of their object by reason of the fact that the discs are composed of pliable material usually containing an amount of rubber sufficient to make the discs practically flow under pressure, the result being that when pressure is brought upon the discs by tightening the spider bolts, the greater part, if not the entire area of the discs under the washers and the spider feet is subjected to a pressure which tends to force the material from under the washers and spider feet; and when to this tendency is added the working strain on the discs, the fabric very readily flows and begins to slip. When this occurs failure of the coupling rapidly follows.

It is one of the primary objects of my invention to overcome the foregoing difficulty and to provide a coupling which not only has a greatly extended period of life, but which is also relatively much stronger and will stand up under greater loads.

The foregoing together with such other objects as may hereinafter appear, I obtain by means of a construction, the preferred embodiments of which I have illustrated in the accompanying drawings, wherein, Figure 1 is a cross section through a single bolt per spider foot flexible joint embodying my improvement; Figure 2 is an elevation of Figure 1; Figure 3 is a fragmentary side elevation of a spider foot of the two bolt type; Figure 4 is a cross section through a two bolt per foot spider; Figure 5 is an end elevation of Figure 4, partially broken away; Figure 6 is an enlarged section, more clearly illustrating certain of the details of my improvement; Figure 7 is a plan view of the single bolt ring washer; and Figure 8 is a plan view of the double bolt ring washer.

Referring now to Figure 1, the shaft 7 may be considered as the driving shaft, and the shaft 8, as the driven shaft, of some form of power transmission means. Each shaft is provided with a spider 9 having a plurality of feet 10, preferably three in number. Between the spiders are the flexible discs 11, preferably composed of plates of fabric and rubber as is customary in this art. At equally spaced intervals, the discs are alternately connected to the feet of the respective spiders by means of bolts 12.

In the single bolt per spider foot construction shown in Figures 1 and 2, the feet are preferably circular at their extremities, and on their outer faces, at the periphery, they are provided with an outstanding annular rim or bead 13, projecting well beyond the face of the spider feet. Between adjacent discs I provide spacing members or rings 14 in the nature of washers, said members having a ring or rounded rim 15 at the periphery, preferably considerably thicker than the web-like inner portion of the washers. The outside washers 16, coming under the heads of the bolts 12, are also provided with rings or thickened rims 15, but for these washers the rim need project from one face only. A plurality of ears 17 are struck up from the washers 16 and are adapted to engage the head of the bolt and prevent the bolt from turning with reference to the nuts. The nuts 18 for the bolts are held against loosening by means of lock washers 19.

It will be noted that the construction is such that when the bolts 18 are tightened, the bead-like marginal rings or ridges 12, 15 of the "dished" connecting or gripping means—the spider feet 10 and the washers 14, 16—are pressed and sunk into the disc material around the corresponding connective areas of the disc, beneath these gripping means; and there is practically little, if any, pressure tending to force or squeeze the material out from under the gripping means. On the contrary, the action of the rims or ridges 12, 15 is to effectually confine the material of the connective areas against any tendency to squeeze out under such pressure as the connecting means may exert on these areas. This confinement results both from the greater intensity of pressure on the zones of engagement with the rims 12, 15 and from the fact that these rims are sunk in the disc faces below the connective areas. As shown, the material within these areas is left substantially undistorted, as compared with the zones of rim pressure, since the plain, flat surfaces within the rims 12, 15 can at most only exert a relatively light and substantially uniform lateral pressure on these areas; and driving is effected through each connective area as a whole. As shown in Fig. 1, the margins or lateral ridges 12, 15 of the dished connective means 10, 14, 16, at opposite sides of each flexible disc 11 are engaged with and sunk into the disc along coincident zones.

The confinement of the connective disc areas and the driving through each of them as a whole (as described above) are contrary to the effect of plain washers, radially fluted washers and concentrically corrugated washers, in all of which, although the pressure may not be equally distributed, there is an effective pressure from the bolt outward which tends to force the material from the bolt hole outward from beneath the feet and washers.

The effects are especially different in the case of laminated discs of rubberized fabric, since plain, radially fluted, and concentrically corrugated washers all tend to depress the fabric layers of such a disc uniformly below the boundary of its connective area, rather than to grip these layers themselves effectively along such boundary without displacement within it—as do dished connective means such as I have described.

I have found as a result of experiment that in this construction the load may be increased almost 50% before slippage takes place and the ultimate load at which the discs will fail is increased by approximately 30%. I attribute this to the fact that the feet and washers, while they have a firm grip on the discs and thus distribute the stresses, nevertheless do not tend to squeeze or force out the material.

In addition less pressure is required on the bolt to secure a firm grip on the discs than with the standard construction heretofore employed, and there is less tendency for the bolt to work loose, even in the absence of the ears 17 because of the greater elasticity obtained due to the pressure of the rims or rings coming on a relatively small area of the disc.

In the construction shown in Figures 3 to 5 inclusive, the feet 10' of the spider are provided with two radially disposed bolt holes 20, and the bead 13', in this case, instead of being circular, follows the shape of the foot, as illustrated in Figure 5. The washers 14' are correspondingly elongated and provided with two bolt holes, the rim 15' corresponding in outline to the bead 13' of the feet of the spiders.

I claim:

1. In a torque-transmitting flexible coupling, the combination with flexible discs of connecting means including lateral clamps, bolt-like members through the discs securing the clamps together, and washers on said members between discs marginally beaded and sunk therein, but leaving the discs substantially undistorted within the zones of such engagement, the margin of the washer being well removed from the hole therein.

2. A connective device for a flexible torque-transmitting disc comprising a washer laterally ridged at its margin, but otherwise substantially plain, the margin of the washer being well removed from the hole therein.

3. A connective device for a flexible torque-transmitting disc comprising a washer marginally beaded toward both faces, but substantially plain within its beaded margin.

In testimony whereof I have hereunto signed my name.

HARRY P. MACDONALD.